United States Patent
Pearl, Jr. et al.

(10) Patent No.: US 12,065,609 B2
(45) Date of Patent: Aug. 20, 2024

(54) EMULSION POLYMERIZED CEMENT SUSPENSION AGENT

(71) Applicant: HALLIBURTON ENERGY SERVICES, INC., Houston, TX (US)

(72) Inventors: William Cecil Pearl, Jr., Spring, TX (US); Samuel J. Lewis, Spring, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 17/052,441

(22) PCT Filed: Jun. 28, 2018

(86) PCT No.: PCT/US2018/040018
§ 371 (c)(1),
(2) Date: Nov. 2, 2020

(87) PCT Pub. No.: WO2020/005255
PCT Pub. Date: Jan. 2, 2020

(65) Prior Publication Data
US 2021/0171818 A1 Jun. 10, 2021

(51) Int. Cl.
*C09K 8/46* (2006.01)
*C04B 28/04* (2006.01)
*C08F 2/22* (2006.01)
*C08F 220/58* (2006.01)

(52) U.S. Cl.
CPC .............. *C09K 8/46* (2013.01); *C04B 28/04* (2013.01); *C08F 2/22* (2013.01); *C08F 220/585* (2020.02)

(58) Field of Classification Search
CPC .......... C09K 8/46; C08F 220/585; C08F 2/22; C04B 28/04
See application file for complete search history.

(56) References Cited

U.S. PATENT DOCUMENTS

| | | |
|---|---|---|
| 4,764,574 A | 8/1988 | Clark, Jr. |
| 6,268,406 B1 | 7/2001 | Chatterji et al. |
| 7,114,569 B2 | 10/2006 | Chatterji et al. |

(Continued)

FOREIGN PATENT DOCUMENTS

| | | | |
|---|---|---|---|
| CN | 105199690 A | 12/2015 | |
| EP | 1065186 A1 * | 1/2001 | ........... C04B 24/163 |

(Continued)

OTHER PUBLICATIONS

Capek, Ignac, "Inverse Emulsion Polymerization of Acrylamide Initiated By Oil-And-Water-Soluable Initiators: Effect of Emulsifier Concentration", Polymer Journal; vol. 36, No. 10, pp. 793-803; 2004.

(Continued)

*Primary Examiner* — Crystal J Lee
(74) *Attorney, Agent, or Firm* — Polsinelli PC

(57) ABSTRACT

A cement composition comprising a hydraulic cement, water and a suspension agent comprising a polymer formed via emulsion polymerization, wherein the polymer has a weight average molecular weight of at least 600,000. The cement composition may be introduced into a wellbore to cement a casing in place within the wellbore. The cement composition is able to maintain consistency and thickness even at high temperatures above 350° F.

10 Claims, 6 Drawing Sheets

(56) References Cited

U.S. PATENT DOCUMENTS

| | | | |
|---|---|---|---|
| 2001/0018470 A1* | 8/2001 | Chatterji | C04B 24/2652 |
| | | | 524/5 |
| 2004/0024154 A1* | 2/2004 | Schinabeck | C08F 220/585 |
| | | | 526/287 |
| 2012/0279707 A1 | 11/2012 | Funkhouser et al. | |
| 2013/0150483 A1 | 6/2013 | Funkhouser et al. | |
| 2015/0191642 A1* | 7/2015 | Nguyen | C09K 8/467 |
| | | | 524/5 |
| 2016/0186037 A1 | 6/2016 | Patil et al. | |
| 2016/0362335 A1* | 12/2016 | Dugonjic-Bilic | C04B 28/04 |

FOREIGN PATENT DOCUMENTS

| | | |
|---|---|---|
| JP | 2007261921 A | 10/2007 |
| WO | 2012150431 A1 | 11/2012 |
| WO | 2015105675 A1 | 7/2015 |

OTHER PUBLICATIONS

Mohsin, Mahmoud A. et al., "Inverse Emulsion Polymerization for the Synthesis of High Molecular Weight Polyacrylamide and Its Application as Sand Stabilizer", Hindawi Publishing Corporation; International Journal of Polymer Science; vol. 2015, Article ID 436583, 10 Pages; Apr. 13, 2015.
International Search Report and Written Opinion for PCT/US2018/040018 mailed Mar. 27, 2019.
English Abstract of CN105199690A from www.espacenet.com.

* cited by examiner

EMULSION POLYMERIZED CEMENT SUSPENSION AGENT

CROSS-REFERENCE TO RELATED APPLICATIONS

This application is a national stage entry of PCT/US2018/040018 filed Jun. 28, 2018, said application is expressly incorporated herein by reference in its entirety.

FIELD

The present disclosure relates to suspension agents for cement compositions in a wellbore environment.

BACKGROUND

In order to access downhole hydrocarbon sources, a wellbore is typically drilled deep within the earth through various underground rock formations. After drilling is terminated, and prior to stimulation and production processes, a steel casing is often provided along a length of the wellbore. The steel casing assists in maintaining the integrity of the wellbore as well as controlling the flow of fluids, for instance preventing wellbore fluids from leaking into freshwater underground reservoirs.

The casing is often made up of a large number of individual tubulars referred to as joints, together forming a casing string. The casing is cemented in place, for instance by pumping a cement composition into the annulus between the casing and a surface of the wellbore. The cement is then allowed to set and form a sheath around the casing. Accordingly, the cement adds an additional barrier as well as provides support to the casing and maintains it in place.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
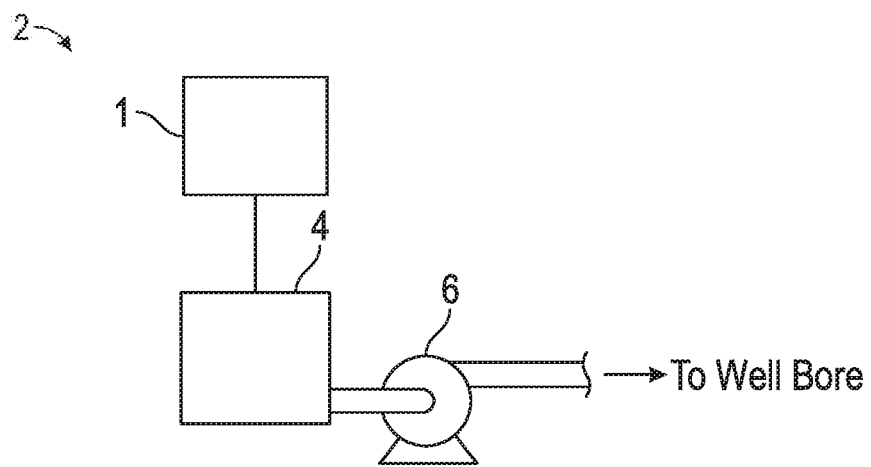
FIG. 1 illustrates a system for preparation and delivery of a cement composition to a well bore in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein is a suspension agent for cement compositions which may be used in a wellbore environment. During cementing operations, such as cementing a casing within a wellbore, the cement is exposed to high temperatures and pressures. As a consequence, the cement may tend to thin with heavier components settling and separating out. This may negatively affect the strength and density of the cement after setting. The suspension agent disclosed herein may assist in maintaining the thickness and consistency of the cement and prevent or delay settling of the cement.

The suspension agent disclosed herein includes a polymer formed via emulsion polymerization, in particular invert emulsion polymerization. Accordingly, the suspension agent does not require any additional cross-linking agents which are used in conventional suspension agents. It is believed the polymer formed via the emulsion polymerization route forms a longer, more linear polymer structure as compared to branched or star polymer which may form via conventional condensation polymerizations. The suspension agent may be effective without the addition of cross-linking agents that may be required for conventional suspension agents. The suspension agent disclosed herein assists in providing stability and preventing settling even at higher temperatures such as 300° F. or more, 350° F. or more, or 400° F. or more.

The suspension agent having the polymer formed via emulsion polymerization may be added to a cement composition as a liquid thereby facilitating handling and ease of preparation in the field. The cement composition may be in slurry form and may be pumped into the wellbore and around the casing thereby fixing the casing in place upon setting.

The cement composition disclosed herein may include a hydraulic cement, water, and a suspension agent. The formation of the cement composition may involve adding a cement, which may be in the form of a particulate, to an aqueous base fluid. The aqueous base fluid may be present in an amount sufficient to form a slurry such that the composition is flowable and may be pumped, wherein the water content of the composition may be in the range of from about 25% to about 75%, alternatively from about 35 to about 50%. The cement may be a hydraulic cement. The cement may include calcium, aluminum, silicon, oxygen, and/or sulfur which set and harden by reaction with water. Such cements may include Portland cement, including API classes A, B, C, G, and H, as well as slag cement, pozzolana cement, gypsum cement, alumina cement, silica cement, and/or a high alkalinity cement. In order to prevent retrogression in cements such as Portland cement, the cement composition may include a retrograde preventer, such as powdered silica or silicon dioxide (sand). The aqueous base fluid may be water or any fluid where water is the major component, including water, ground water, seawater, brine, saltwater, freshwater, or the like.

The suspension agent herein may be added to the cement composition, where the cement composition may be in slurry form. The suspension agent may consist of or include a polymer formed via emulsion polymerization, and in particular, via invert emulsion polymerization. In general, emulsion polymerization involves a monomer that is dissolved in a first dispersed phase which is emulsified, or otherwise dispersed, in a second continuous phase. Accordingly, the monomer may be in the form of droplets dispersed within the continuous phase. Standard emulsion polymerization herein refers to the case where oil, or some oleaginous fluid, is the dispersed phase, and water, or some aqueous fluid, is the continuous phase. Invert emulsion polymerization refers to the inverse case where water, or some aqueous fluid, is the dispersed phase, and oil, or some oleaginous fluid, is the continuous phase. The term emulsion used herein encompasses both types of the aforementioned emulsion types, standard and invert, unless otherwise noted.

A surfactant (which may also be referred to as an emulsifying agent, or emulsifying surfactant) can be added to the emulsion which may form micelles in the emulsion. The surfactant may also surround and encompass droplets of monomer. The selection of the type of surfactant may depend on whether water or oil is the continuous phase. The interior of the formed micelles may contain a portion of the monomer thereby serving as a site for polymerization. An initiator is added to the emulsion which is at least partially soluble in the micelles, and accordingly migrates or diffuses into the core of the micelles where it contacts the monomer and initiates polymerization. As polymerization of the monomer occurs, additional monomer migrates into the micelle, for instance from larger dispersed droplets until polymerization is complete. The formed polymer may be particles or droplets surrounded by the surfactant and dispersed within the continuous phase. This final product may be referred to as a latex (with the polymer as latex particles), a polymer colloid or emulsion.

The monomers for forming the suspension agent described herein may include those monomers which may be, or dissolve within, the dispersed phase of the emulsion.

Suitable monofunctional monomers include N-substituted and N,N-disubstituted acrylamides. The N in the N-substituted or N,N-disubstituted acrylamides may be substituted independently of one another with methyl, ethyl, propyl, butyl, or pentyl hydrocarbon groups, and/or with straight, branched or cyclic $C_1$-$C_2$, $C_1$-$C_3$, $C_1$-$C_4$, $C_1$-$C_5$, or $C_1$-$C_6$ alkyls, or substituted or unsubstituted aryls, hydroxyl, or acids, carboxylic acids, sulfonic acids, or phosphonic acids, or esters or salts of such acids. The alkyls or aryl attached to the N, or the N itself may be substituted with acids such as sulfonic acid or phosphonic acid. The N may be substituted with sulfonates or alkylsulfonate where the alkyl is methyl, ethyl, propyl, butyl, or pentyl, or a linear or branched $C_1$-$C_2$, $C_1$-$C_3$, $C_1$-$C_4$, $C_1$-$C_5$, or $C_1$-$C_6$ alkyls. Other suitable monomers include N-vinylamides and N-alkyl-N-vinylamides. The polymers formed may be homopolymers, copolymers, terpolymers, or from a plurality of different monomers.

Particular examples of suitable monomers include, but are not limited to, one or more of the following N,N-dimethylacrylamide ("NNDMA"), 2-acrylamido-2-methylpropanesulfonic acid ("ASulf"), 2-acrylamido-2-methylpropane- sulfonate salts having counter ions such as sodium, calcium, magnesium, and ammonium ions, sodium 2-acrylamido-2-methylpropanesulfonate, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and any derivative thereof, and mixtures thereof. Example copolymers may include NNDMA/ASulf copolymer. When an NNDMA/ASulf copolymer is employed, the ratio of NNDMA to ASulf mole ratio may range of from about 1:5 to about 5:1, or alternatively from about 1:4 to about 4:1, or alternatively from about 1:3 to about 3:1, or alternatively from about 1:2 to about 2:1.

The weight average molecular weight (daltons) of the polymerized polymer may be at least 600,000, or alternatively at least 700,000, or alternatively at least 800,000, or alternatively at least 900,000, or alternatively at least 1 million (M), or alternatively at least 1.1M, or alternatively at least 1.2M or alternatively in a range of from 600,000 to 4M, or alternatively from 700,000 to 2.5M, or alternatively of from 1M to 1.5M.

The monomers may be dissolved in a fluid which may form the first dispersed phase, which in the case of an invert emulsion may be water or any aqueous fluid. The aqueous fluid may be any of those mentioned previously for the aqueous base fluid used for the cement. More particularly, the aqueous fluid may be a distilled, clear or clean water so as to omit any potential contaminates or components which may interfere with the polymerization. The dissolved fluid may then be added to an oleaginous fluid.

The oleaginous fluid may be any hydrocarbon oil, and may be natural or synthetic oil. The oleaginous may be any aliphatic hydrocarbon, such as paraffins (alkanes), olefins (alkenes), or α-olefins, having from 5 to 15 carbons, or 10-14 carbons, including straight- and branched-chain hydrocarbons such as pentane, hexane, heptane, octane and the like, as well as alkyl-substituted derivatives thereof, as well as cyclic hydrocarbons such as cycloaliphatic hydrocarbons, such as cyclopentane, cyclohexane, cycloheptane, decalin and the like, as well as alkyl-substituted derivatives thereof. The oleaginous fluid may also be an aromatic compound and alkyl-substituted derivatives thereof, such as benzene, naphthalene, toluene, xylene and the like.

The dissolved monomer, or the aqueous phase having dissolved monomer, may be added to the oleaginous phase and emulsified by adding a surfactant. The surfactant may be non-ionic, and may include sorbitan fatty acid esters and polyethoxylated sorbitan fatty acid esters. The fatty acid may have from 10-20 carbons, and may be saturated, mono or polyunsaturated, and may be for instance lauric acid, stearic acid, or oleic acid, and may include one to three fatty acid groups (designated mono-, di-, or tri-), and may include from 4-20 ethoxylate groups. Particular examples (with commercial availability indicated by a corresponding mark Tween® in parenthesis by ICI Americas, Inc.) include polyoxyethylene sorbitan monolaurate (Tween® 20), polyoxyethylene sorbitan monopalmitate (Tween® 40), polyoxyethylene sorbitan monostearate (Tween® 60, Tween® 61), polyoxyethylene sorbitan tristearate (Tween® 65), polyoxyethylene sorbitan monooleate (Tween® 80), and polyoxyethylene sorbitan trioleate (Tween® 85).

Additionally, surfactants include polyalkoxylated alcohols, polyethyoxylated alcohols, and may have straight chained or branched alkyl groups having from 10-30 carbons, and may have 1 to 50 ethoxylate groups. Particular examples of polyethyoxylated alcohols include polyoxyethylene cetyl alcohol, polyoxyethylene cetyl/stearyl alcohol.

The mixture can then be stirred at high speed such that the aqueous phase is further mechanically homogenized into the oleaginous phase to form the invert water-in-oil emulsion. An initiator may then be added. The initiator may include any radical initiator, including azo-containing compounds, peroxide or hydroperoxide containing compounds, including 2,2'-azoisobtyronitrile (AIBN), 2,2'-azobis(2-methylpropionitrile), benzoyl peroxides, lauroyl peroxides, potassium persulfates, tertiary-butyl hydroperoxides, as well as bromate-sulfites, peroxide-sulfites, hydroperoxide-bisulfates, and sodium metabisulfates.

The polymerization reaction may occur at a temperature of from about 25° C. to about 55° C. The water may be removed to form a polymer latex with the polymer particles emulsified within the oleaginous phase. As the resulting mixture is in liquid form, this facilitates mixing with the cement slurry for pumping downhole. The suspension agent may be added to the cement slurry in the range of 5% to 75% of the total composition.

The cement composition may include weighting agents. Suitable weighting agents for use in the present invention may be any known weighting agent that is a particulate including, but not limited to, barite; hematite, manganese tetraoxide, galena, silica, siderite, celestite, ilmenite, dolomite, calcium carbonate, and any combination thereof. The density of the composition may range from about 7 to 22 lbs/gal, alternatively from 9 to 15 lbs/gal.

The cement composition disclosed herein, which may be in slurry form, having the cement and suspension agent is particularly advantageous in higher temperature applications. The cement composition having the suspension agent disclosed herein preservers the thickness and consistency at higher temperatures including 300° F. or more, or 350° F. or more, or 400° F. or more, and may maintain the consistency and thickness for at least 3 hours, alternatively, at least 4 hours, alternatively, at least 5 hours. As will be illustrated in the examples further below, the consistency is maintained such that when the composition is subject to perturbation (such as stirring), followed by removal of the perturbation, the change in consistency, as measured by Bearden Consistency units ("Bc"), exhibits a change of no more than 9Bc, alternatively, no more than 15 Bc, at 350° F., and, alternatively, no more than 34Bc, alternatively, no more than 40 Bc, and alternatively, no more than 45 Bc at 400° F.

Figure 2:
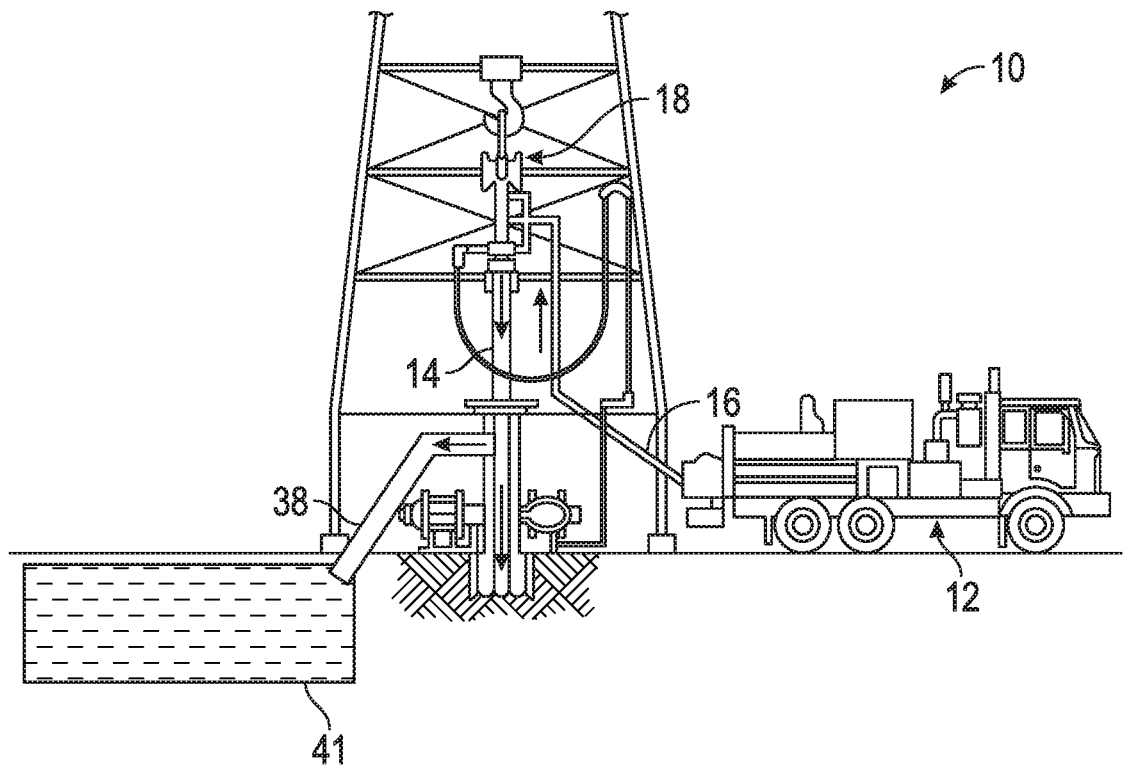
FIG. 2 illustrates surface equipment that may be used in placement of a cement composition in a well bore in accordance with aspects of the present disclosure.
Figure 3:
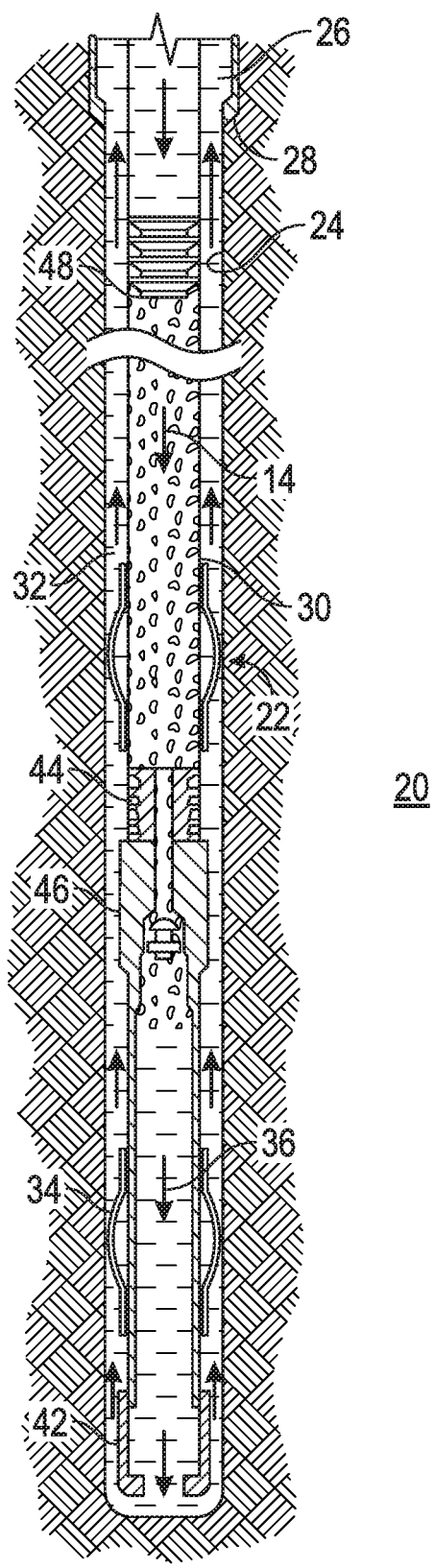
FIG. 3 illustrates placement of a cement composition into a well bore annulus in accordance with aspects of the present disclosure.

FIGS. 1-3 describe the mixing and pumping of the cement slurry and suspension agent disclosed herein.

FIG. 1 is a diagram of a system that may be used in the preparation of a cement composition in accordance with example embodiments that will now be described. FIG. 1 illustrates a system 2 for preparation of a cement composition and delivery to a well bore in accordance with certain embodiments. The suspension agent 1, which may be held in a container, may be pumped or added in liquid form to the cement and water being mixed in mixing equipment 4 thereby forming a cement composition. As shown, the cement composition (in the form of a cement slurry) may be contained and mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

An example technique and system for placing a cement composition into a subterranean formation will now be described with reference to FIGS. 2 and 3. FIG. 2 is a diagram illustrating surface equipment 10 that may be used in the placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Turning now to FIG. 3, FIG. 3 is a diagram illustrating the cement composition 14 being introduced into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line, such as flow line 38 depicted in FIG. 2, and be deposited, for example, in one or more retention pits 41 (e.g., a mud pit), as shown on FIG. 2. Referring again to FIG. 3, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 3, the bottom plug 44 is shown on the landing collar 46. In the illustrated embodiment, a top plug 48 may be introduced into the well bore 22 behind the cement composition 14. The top plug 48 may separate the cement composition 14 from a displacement fluid and also push the cement composition 14 through the bottom plug 44.

The following examples are intended to be illustrative only, and are not intended to be, nor should they be construed as limiting in any way of the scope of the present disclosure.

Example 1

A suspension test was conducted to test the efficacy of the suspension agent disclosed herein as compared to a conventional suspension agent, and which resulted in the suspension agent according to the present disclosure demonstrating superior results. In this testing procedure, the thickening time of a cement slurry is tested as it is subject to on-off-on stirring cycles. The cement slurry is held in a vessel at a temperature of 350° F., and then at 400° F. and subject to perturbation by stirring 150 rpm (such as by a paddle or impeller driven by a motor) and then set for 3 off cycles for 15 minutes each. The suspension agent disclosed herein, an NNDMA/ASulf copolymer prepared via invert emulsion polymerization, is provided in a first cement slurry, with results shown in FIG. 4. A comparative cement slurry having a conventional suspension agent, also an NNDMA/ASulf copolymer, but prepared according to precipitation polymerization, with results shown in FIG. 4. Accordingly, the polymer has the same polymer chemistry, but differs in polymer structure as a result of the different polymerization reaction. It is believed that the invert emulsion polymerized suspension agent has a more linear structure than the conventional precipitation polymerized suspension agent.

Figure 4:
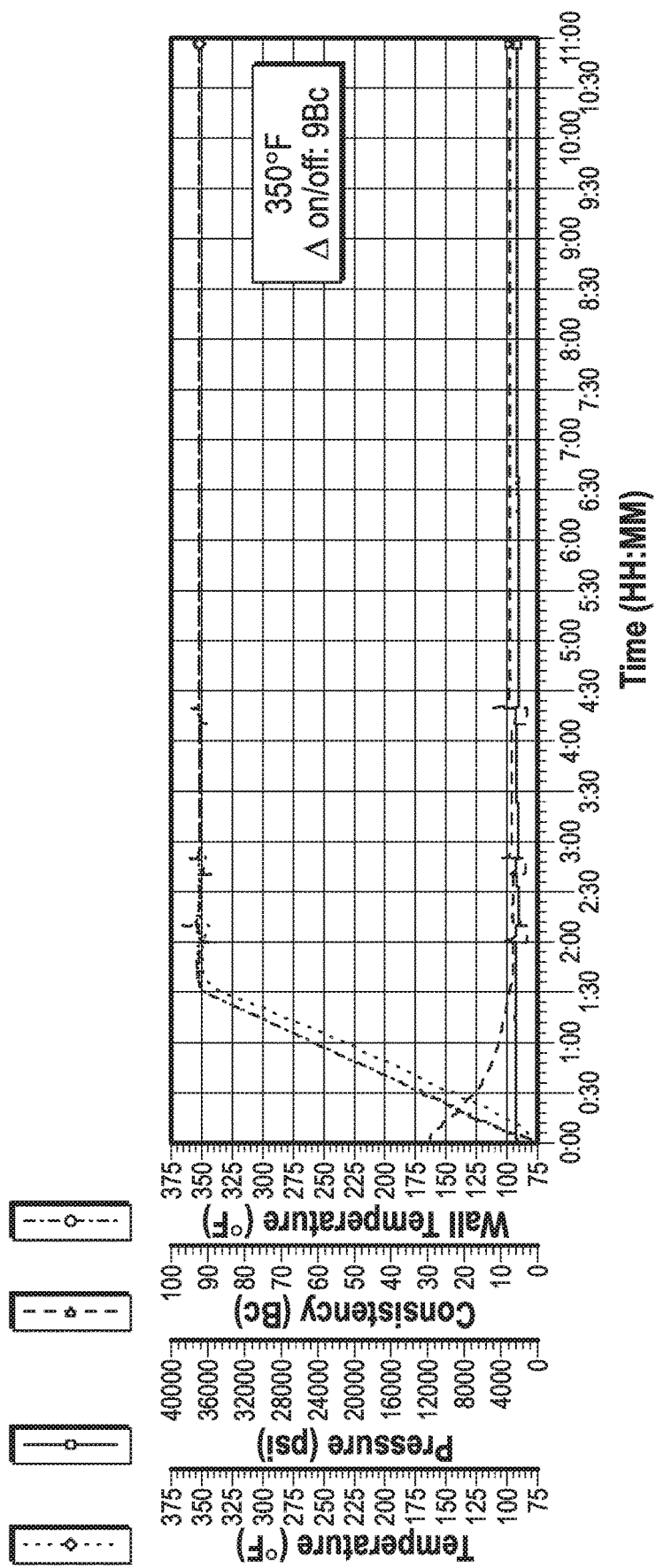
FIG. 4 is a graph illustrating properties of a cement composition having a suspension agent, in accordance with aspects of the present disclosure.
Figure 5:
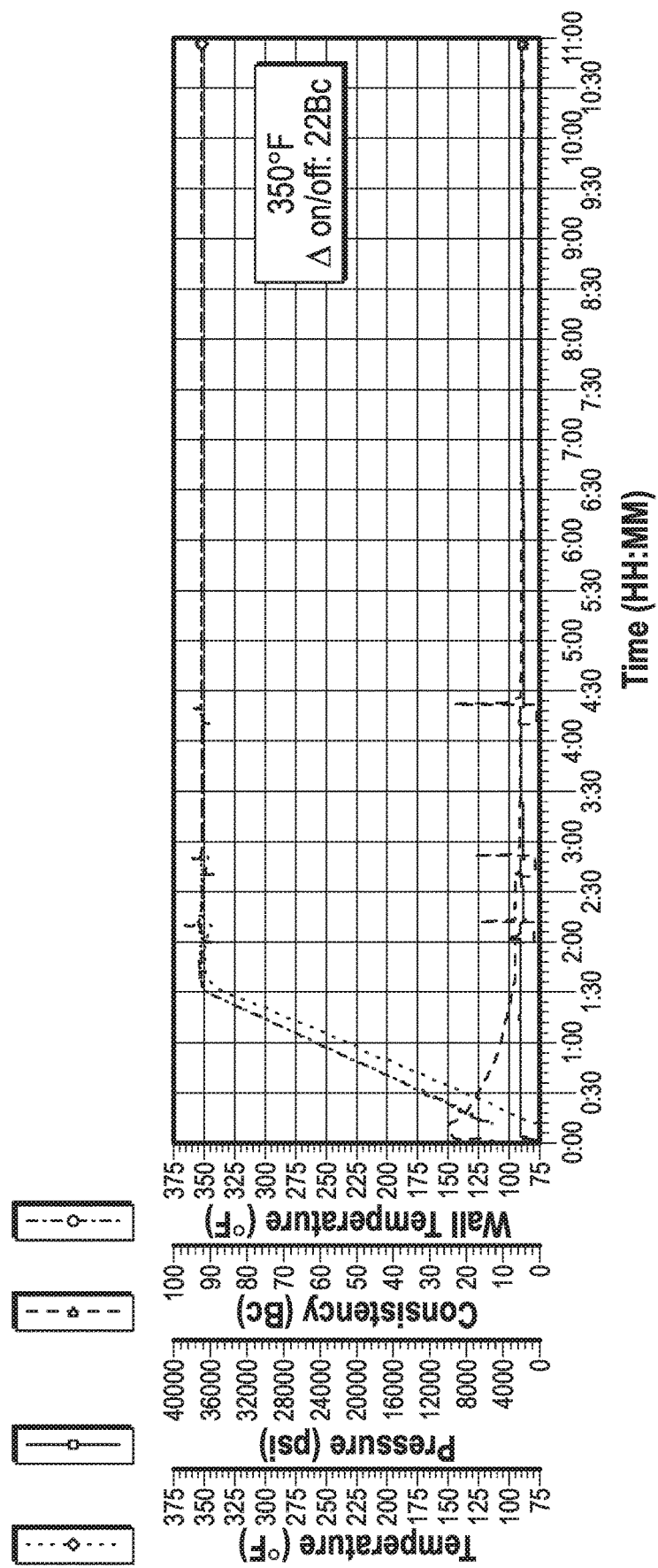
FIG. 5 is a graph illustrating properties of a comparative cement composition having a conventional suspension agent.

In FIGS. 4 and 5, the temperature of the slurry, wall temperature (of the vessel), pressure, consistency (as measured in Bc) are illustrated as a function of time. In the example of FIGS. 4 and 5, the temperature of the slurry is tested at 350° F. At each time the stirring is cycled off, the graph line dips, and then upon re-initiation of the stirring, the graph line spikes. The relative height of the spike when the stirring begins indicates the performance of the suspension agent for mitigating settling. In particular, the larger the spike, the worse the performance as it indicates less thickening and consistency. On the other hand, a lower spike indicates greater thickness and consistency.

As illustrated in FIGS. 4 and 5, the stirring was cycled off at about the 2:00 hr, 2:40 hr, and 4:10 hr mark for about 15 mins, then turned on. As shown, the suspending agent according to the present disclosure illustrated in FIG. 4 shows a spike (or differential change indicated by A) of about 9Bc, whereas FIG. 5 shows a spike of about 22 Bc. Accordingly, the suspending agent according to the present disclosure, as indicated by FIG. 4, exhibits superior performance compared to the conventional suspending agent as indicated in FIG. 5.

Figure 6:
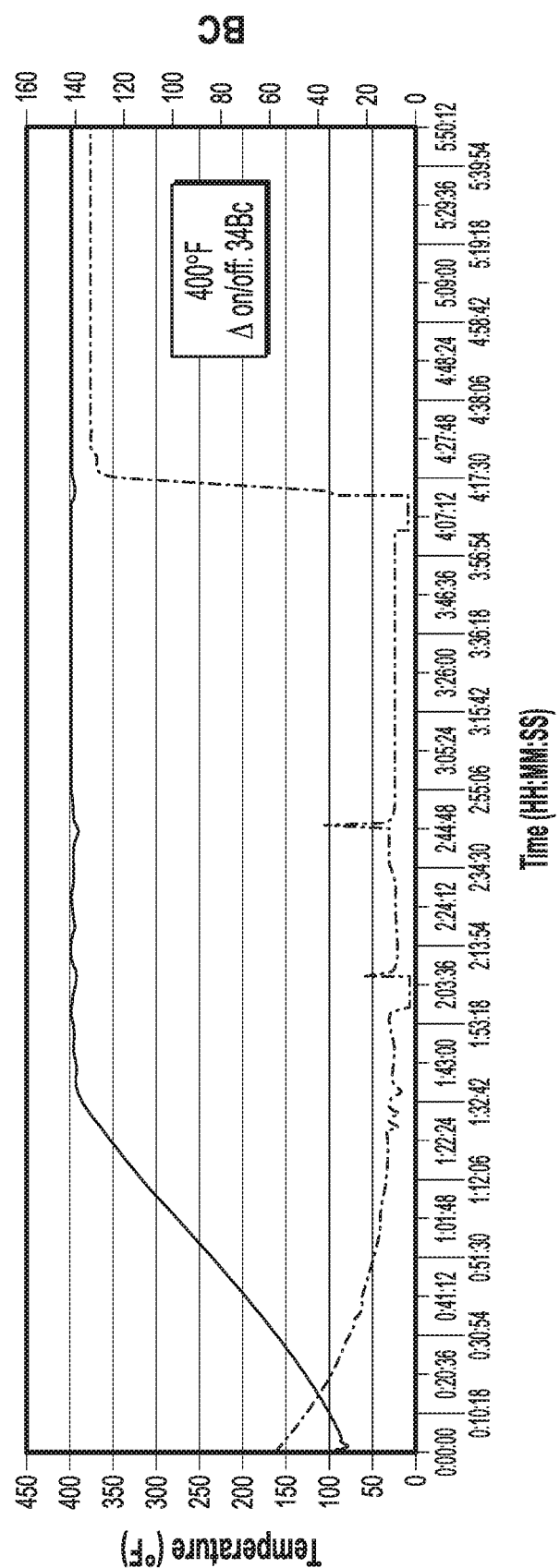
FIG. 6 is a graph illustrating properties of a cement composition having a suspension agent, in accordance with aspects of the present disclosure.
Figure 7:
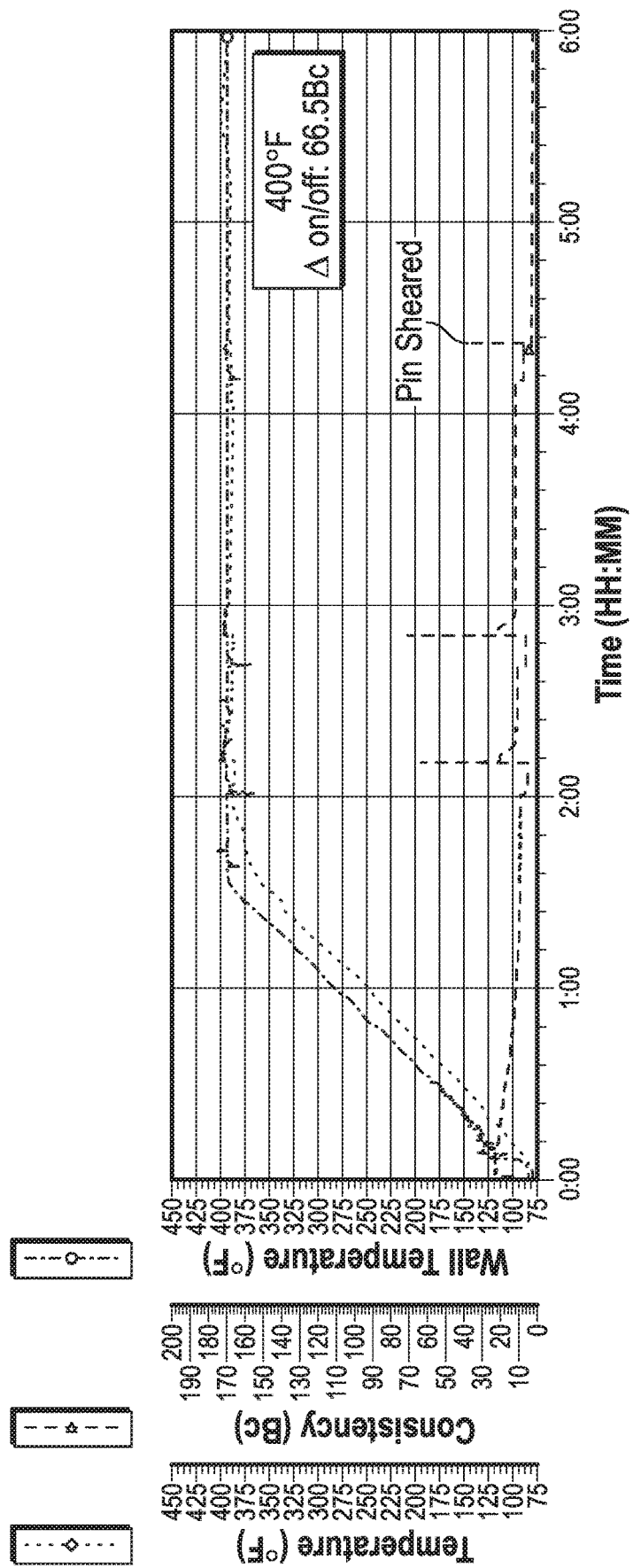
FIG. 7 is a graph illustrating properties of a comparative cement composition having a conventional suspension agent.

FIGS. 6 and 7 illustrate the same test, however, conducted at 400° F. Again the stirring was cycled off at about the 2:00 hr, 2:40 hr, and 4:10 hr mark for about 15 mins, then turned on. As shown, the suspending agent according to the present disclosure illustrated in FIG. 6 shows a spike of about 34Bc, whereas FIG. 7 shows a spike of about 66.5 Bc. In the $3^{rd}$ cycle, at about 4:10 in both FIGS. 6 and 7, the stirring pin is sheered indicating failure, as a result of the increase in density of both cements after cycling off.

The experimental results demonstrate the suspension agents according to the present disclosure, surprisingly, demonstrate advantageous results including improved thickening and consistency and stability of the cement composition.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

Numerous examples are provided herein to enhance understanding of the present disclosure. A specific set of statements are provided as follows.

Statement 1: A method comprising: providing a cement composition comprising a suspension agent, wherein the suspension agent comprises a polymer formed via an emulsion polymerization with a molecular weight of at least 600,000; and introducing the cement composition into a wellbore.

Statement 2: A method according to statement 1, further comprising introducing the cement composition into a portion of the wellbore having a temperature of at least 350° F.

Statement 3: A method according to statement 1, further comprising introducing the cement composition into an annulus between a casing and a wall of the wellbore; and allowing the cement composition to set.

Statement 4: A method according to statement 1, wherein the polymer is formed via an invert emulsion polymerization.

Statement 5: A method according to statement 4, wherein the invert emulsion polymerization comprises: dissolving a monomer in an aqueous fluid, emulsifying the monomer containing aqueous fluid in an oleaginous fluid to form an invert emulsion, and adding an initiator.

Statement 6: A method according to statement 1, wherein the polymer is formed from a monomer comprising acrylamide.

Statement 7: The method according to claim 1, wherein the the polymer is formed from a monomer selected from the group consisting of N,N-dimethylacrylamide, sodium 2-acrylamido-2-methylpropanesulfonate, 2-acrylamido-2-methylpropanesulfonic acid, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and mixtures thereof.

Statement 8: The method according to statement 1, wherein the polymer is a copolymer of N,N-dimethylacrylamide and sodium 2-acrylamido-2-methylpropanesulfonate.

Statement 9: The method according to statement 1, wherein the emulsion polymerization comprises adding an initiator.

Statement 10: The method according to statement 1, wherein the polymer is added as a liquid to the cement composition.

Statement 11: The method according to statement 1, wherein the cement composition comprises a hydraulic cement and water sufficient to form a slurry, the method further comprising introducing the cement composition into the wellbore using one or more pumps.

Statement 12: A cement composition comprising: a hydraulic cement; water; and a suspension agent comprising a polymer formed via an emulsion polymerization, wherein the polymer has a weight average molecular weight of at least 600,000.

Statement 13: A composition according to statement 12, wherein the polymer is formed via an invert emulsion polymerization.

Statement 14: A composition according to statement 12, wherein the polymer is formed from a monomer comprising acrylamide.

Statement 15: A composition according to statement 12, wherein the polymer is formed from a monomer selected from the group consisting of N,N-dimethylacrylamide, sodium 2-acrylamido-2-methylpropanesulfonate, 2-acrylamido-2-methylpropanesulfonic acid, N-(hydroxymethyl) acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and mixtures thereof.

Statement 16: The composition according to statement 12, wherein the polymer is a copolymer of N,N-dimethylacrylamide and sodium 2-acrylamido-2-methylpropanesulfonate.

Statement 17: The composition according to statement 12, wherein the emulsion polymerization comprises a step of adding an initiator.

Statement 18: The composition according to statement 12, wherein the emulsion polymerization comprises dissolving a monomer in an aqueous fluid and emulsifying the monomer containing aqueous fluid in an oleaginous fluid.

Statement 19: The composition according to statement 12, wherein the hydraulic cement is Portland cement.

Statement 20: The composition according to statement 12, wherein the cement composition does not include a cross-linking agent for the suspension agent.

What is claimed is:

1. A method comprising:
    dissolving one or more monomers comprising acrylamide in an aqueous fluid,
    emulsifying the aqueous fluid containing the one or more monomers comprising acrylamide in an oleaginous fluid to form an invert emulsion,
    adding an initiator to the invert emulsion forming a suspension agent comprising a polymer;
    adding the suspension agent into a cement composition, wherein the polymer comprises a molecular weight of at least 600,000; and
    introducing the cement composition into a portion of a wellbore having a temperature of at least 300° F. and the suspension agent maintains a thickness and consistency of the cement composition and prevents settling of the cement composition,
    wherein the cement composition does not include a cross-linking agent for the suspension agent,
    wherein the suspension agent is added into the cement composition as a liquid.

2. The method of claim 1, further comprising introducing the cement composition into an annulus between a casing and a wall of the wellbore; and
    allowing the cement composition to set.

3. The method of claim 1, wherein the polymer is formed from one or more monomers selected from the group consisting of N,N-dimethylacrylamide, sodium 2-acrylamido-2-methylpropanesulfonate, 2-acrylamido-2-methylpropanesulfonic acid, N-92650004.12 (hydroxymethyl) acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and mixtures thereof.

4. The method of claim 1, wherein the polymer is a copolymer of N,N-dimethylacrylamide and sodium 2-acrylamido-2-methylpropanesulfonate.

5. The method of claim 1, wherein the cement composition comprises a hydraulic cement and water sufficient to form a slurry, the method further comprising introducing the cement composition into the wellbore using one or more pumps.

6. A cement composition comprising:
    a hydraulic cement;
    water; and
    a suspension agent comprising a polymer formed via invert emulsion polymerization, wherein the polymer comprises a molecular weight of at least 600,000, one or more monomers comprising acrylamide, and the suspension agent maintains a thickness and consistency of the cement composition and prevents settling of the cement composition at a temperature of at least 300° F.,
    wherein the cement composition does not include a cross-linking agent for the suspension agent,
    wherein the suspension agent is added into the cement composition as a liquid.

7. The cement composition of claim 6, wherein the polymer is formed from one or more monomers selected from the group consisting of N,N-dimethylacrylamide, sodium 2-acrylamido-2-methylpropanesulfonate, 2-acrylamido-2-methylpropanesulfonic acid, N-(hydroxymethyl) acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and mixtures thereof.

8. The cement composition of claim 6, wherein the polymer is a copolymer of N,N-dimethylacrylamide and sodium 2-acrylamido-2-methylpropanesulfonate.

9. The cement composition of claim 6, wherein the invert emulsion polymerization comprises dissolving one or more monomers comprising acrylamide in an aqueous fluid and emulsifying the monomer containing aqueous fluid in an oleaginous fluid.

10. The cement composition of claim 6, wherein the hydraulic cement is Portland cement.

* * * * *